UNITED STATES PATENT OFFICE.

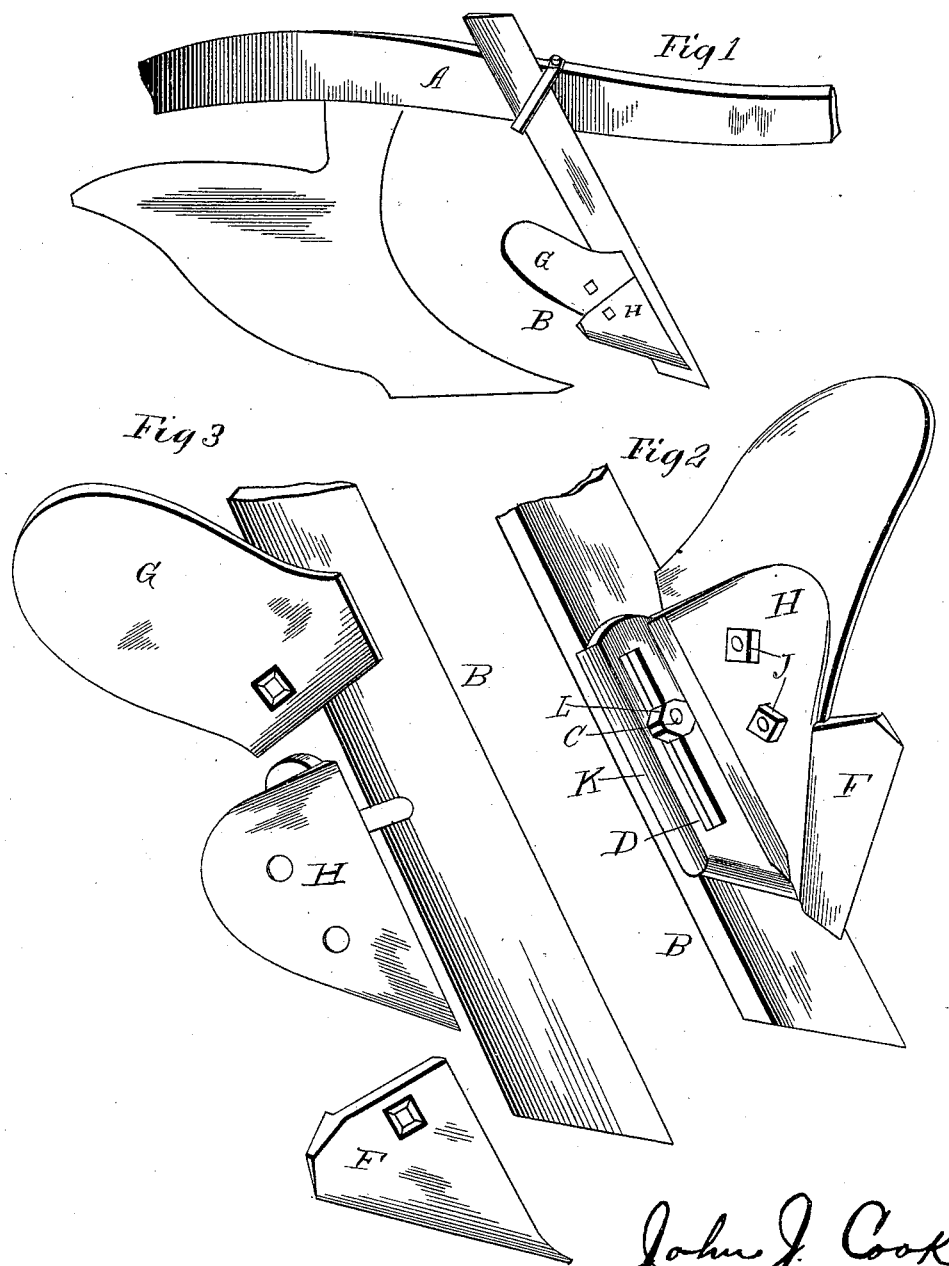

JOHN J. COOK, OF EAST SPRINGFIELD, NEW YORK.

PLOW.

SPECIFICATION forming part of Letters Patent No. 425,211, dated April 8, 1890.

Application filed December 19, 1889. Serial No. 334,269. (No model.)

*To all whom it may concern:*

Be it known that I, JOHN J. COOK, a citizen of the United States, residing at East Springfield, in the county of Otsego and State of New York, have invented certain new and useful Improvements in Plows; and I do hereby declare the following to be a full, clear, and exact description of the invention, such as will enable others skilled in the art to which it appertains to make and use the same.

My invention relates to improvements in plow attachments; and it consists in certain novel features hereinafter described and claimed.

In the annexed drawings, Figure 1 is a perspective view of a plow provided with my improved attachments. Fig. 2 is a detail side view showing the improved device in a different position, and Fig. 3 is a view showing the several parts in detached perspective and in their proper relative positions.

The plow A is of the usual or any preferred construction, and to the beam or tongue of the same, in advance of the share, I secure the colter B, which consists of a bar depending from the beam and having a sharpened front edge. At a suitable point of the colter I mount thereon a bolt C, the end of which projects laterally from the side of the colter and is engaged by a slotted arm D on the rear side of the jointer E. The jointer E consists of the point or blade F, the mold-board G, and the connecting-plate H. The point or blade is of the substantially triangular shape shown, and is provided on its rear side with the groove I, which is engaged by the lower edge of the connecting-plate, and the lower end of the mold-board extends below the connecting-plate and rests against the upper edge of the cutter or point. Securing-bolts J are passed through the point and the connecting-plate and through the said plate and the mold-board to secure the parts firmly together. The slotted arm D is formed on the rear side of the connecting-plate and projects rearward therefrom, as shown, its rear edge being provided with rib K, which engages the edge of the colter, and thereby aids in holding the jointer to the same. A nut L on the end of the bolt C is turned up against the side of the arm D to secure the jointer to the colter.

The advantages of my improved device are thought to be obvious from the foregoing description, taken in connection with the accompanying drawings. The attachment is arranged upon the plow as shown and described, and the plow is then operated in the usual manner. As the plow is drawn along, the colter cuts out the line of the furrow and cuts up all roots and weeds in the same, after which the jointer opens the furrow, so that the plow has only to break up the earth. It will be observed that the jointer can be adjusted to run to any desired depth, and that it can be easily removed, if so desired, thereby leaving only the ordinary colter.

By the use of my improved attachment the draft of the plow is reduced to a minimum and the work of breaking up the earth easily and quickly accomplished. By arranging the connecting-plate as shown and described the joint between the point and mold-board is covered and re-enforced and the device strengthened, so that it will be rendered very durable.

Having thus described my invention, what I claim, and desire to secure by Letters Patent, is—

The combination of the point having a groove on its rear side, the mold-board arranged above the point, the connecting-plate having its lower edge engaging the groove in the point bolted to said point and to the mold-board and provided on its rear side with a longitudinally-slotted arm, the colter, and the securing-bolt passing through the colter and the slot in said arm, as set forth.

In testimony whereof I affix my signature in presence of two witnesses.

JOHN J. COOK.

Witnesses:
ALONZO BOWMAN,
CLARENCE M. BATES.